(12) United States Patent
Kawamura

(10) Patent No.: US 9,378,912 B2
(45) Date of Patent: Jun. 28, 2016

(54) ELECTRONIC COMPONENT ASSEMBLY STRUCTURE AND ELECTRICAL JUNCTION BOX

(71) Applicant: Yazaki Corporation, Tokyo (JP)

(72) Inventor: Yukihiro Kawamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/867,592

(22) Filed: Sep. 28, 2015

(65) Prior Publication Data

US 2016/0020049 A1    Jan. 21, 2016

Related U.S. Application Data

(63) Continuation of application No. PCT/JP2014/059814, filed on Apr. 3, 2014.

(30) Foreign Application Priority Data

Apr. 15, 2013  (JP) ................................. 2013-084828

(51) Int. Cl.
*H01H 45/02* (2006.01)
*H01R 13/73* (2006.01)
*H01R 13/11* (2006.01)
(Continued)

(52) U.S. Cl.
CPC ............. *H01H 45/02* (2013.01); *H01R 13/113* (2013.01); *H01R 13/73* (2013.01); *H01R 4/185* (2013.01); *H01R 13/629* (2013.01); *H02G 3/16* (2013.01)

(58) Field of Classification Search
CPC ..... H01H 45/14; H01H 45/02; H01R 13/113; H01R 13/73
See application file for complete search history.

(56) References Cited

U.S. PATENT DOCUMENTS

2002/0142670 A1* 10/2002 Listing .................... H01H 9/10
                                                                439/709
2009/0203236 A1*  8/2009 Akahori .............. B60R 16/0238
                                                                439/76.1

(Continued)

FOREIGN PATENT DOCUMENTS

JP    2001-167680 A    6/2001
JP    2010-221787 A    10/2010

(Continued)

OTHER PUBLICATIONS

International Search Report of PCT/JP2014/059814 dated Jun. 17, 2014 [PCT/ISA/210].

*Primary Examiner* — Briggitte R Hammond
(74) *Attorney, Agent, or Firm* — Sughrue Mion, PLLC

(57) ABSTRACT

An electronic component includes a main body section having a rectangular parallelepiped shape and terminal portions disposed in the main body section. A housing member includes a first housing chamber that guides and accommodates the main body section therein and a second housing chamber that accommodates and holds terminal fittings therein. Each terminal portion includes a fitting portion that droops along a side surface of the main body section with a gap from the side surface and that is fitted to the corresponding terminal fitting. Each terminal fitting includes a spring portion that presses the corresponding fitting portion, and a pressing direction of the spring portion is held to direct to the corresponding wall portion. The electronic component, the terminal fittings, and the housing member are mutually assembled.

4 Claims, 15 Drawing Sheets

(51) Int. Cl.
*H02G 3/16* (2006.01)
*H01R 4/18* (2006.01)
*H01R 13/629* (2006.01)

(56) References Cited

U.S. PATENT DOCUMENTS

2010/0271168 A1* 10/2010 Niedzwiecki .......... H01H 9/102
 337/194
2012/0217143 A1* 8/2012 Kiyono ................ H01H 9/0271
 200/17 R
2013/0082048 A1* 4/2013 Hirasawa ................ H01R 13/73
 220/3.9
2013/0237074 A1* 9/2013 Yagome ................ H01R 13/44
 439/135
2013/0237078 A1 9/2013 Ikeda et al.
2014/0159837 A1* 6/2014 Hiraiwa ................ H01H 9/443
 335/201

FOREIGN PATENT DOCUMENTS

JP 2012-119292 A 6/2012
JP 2012-243720 A 12/2012

* cited by examiner

ELECTRONIC COMPONENT ASSEMBLY STRUCTURE AND ELECTRICAL JUNCTION BOX

CROSS-REFERENCE TO RELATED APPLICATION

This application is a continuation application of International Application PCT/JP2014/059814, filed on Apr. 3, 2014, and designating the U.S., the entire contents of which are incorporated herein by reference.

BACKGROUND OF THE INVENTION

1. Field of the Invention

The present invention relates to an electronic component assembly structure in which an electronic component, terminal fittings of electrical wires, and a housing member accommodating the electronic component and the terminal fittings therein are mutually assembled, and an electrical junction box having the assembly structure.

2. Description of the Related Art

In general, a vehicle such as an automobile is equipped with an electronic component module in which various electronic components are assembled. Japanese Patent Application Laid-open No. 2010-221787 discloses a configuration of an electrical junction box (junction box) including a relay module to control connection between a power supply device and an electric component.

FIG. 19 is a longitudinal-sectional view of a relay module according to the related art. FIG. 19 illustrates a configuration of the relay module according to the related art and such a relay 90 includes a relay main body 91 formed in a rectangular parallelepiped shape and a plurality of plate-like terminal portions (hereinafter, referred to as relay terminals) 92 protruding in a straight line shape from one surface (bottom surface) of the relay main body 91. Such a type of relay 90 is assembled into a resinous holding member 95, which holds terminal fittings 94 connected to electrical wires 93, to constitute a relay module. The relay module is assembled into an electrical junction box. FIG. 19 is basically a longitudinal-sectional view of the relay module according to the related art and illustrates only the relay main body 91 in a side view.

In the relay module according to the related art illustrated in FIG. 19, a spring portion 96 to which the relay terminal 92 is fitted is formed in each terminal fitting 94, and the relay 90 is held in the holding member 95 by inserting and fitting the tips of the plurality of relay terminals 92 into the spring portions 96. Accordingly, in inserting the relay terminals 92 into the spring portions 96, the relay 90 is likely to be inclined until the relay terminals 92 are fitted to the spring portions 96. Since the inclination direction of the relay 90 is not particularly regulated, the relay 90 may be inclined in any direction of the front, back, right, and left directions and the inclination direction. FIGS. 20A and 20B are enlarged views illustrating a positional relationship between the relay terminals and the terminal fittings (plate portions and spring portions) in the relay module according to the related art. For example, when the relay 90 is inclined to the left in FIG. 19, the tips of the relay terminals 92 are directed to the spring portions 96 as illustrated in FIG. 20A. When the relay terminals 92 move to the spring portions 96 in this state, as illustrated in FIG. 20B, the relay terminals 92 may collide with the spring portions 96 to damage the spring portions 96 in a state the relay terminals depart from a proper insertion direction with respect to the terminal fittings 94 (a downward direction of the vertical direction in the drawing).

SUMMARY OF THE INVENTION

The present invention has been made in consideration of the above-mentioned circumstances and an object thereof is to suppress damage of a spring portion of a terminal fitting in an electronic component module.

In order to achieve the above mentioned object, an electronic component assembly structure according to one aspect of the present invention includes an electronic component; a terminal fitting to which the electronic component is fitted; and a housing member in which the electronic component and the terminal fitting are accommodated, wherein the electronic component includes a main body section having a rectangular parallelepiped shape and a terminal portion disposed in the main body section, the housing member includes a first housing chamber that guides and accommodates the main body section therein and a second housing chamber that accommodates and holds the terminal fitting therein, the first housing chamber is formed by surrounding four sides thereof with a frame-like wall portion rising upright from a bottom portion, and the second housing chamber is formed outside the wall portion interposed therebetween, the terminal portion includes a fitting portion that droops along a side surface of the main body section with a gap from the side surface and that is fitted to the terminal fitting, the terminal fitting includes a spring portion that presses the fitting portion, and a pressing direction of the spring portion is held to direct to the wall portion, and the electronic component, the terminal fitting, and the housing member are mutually assembled.

According to this configuration, the main body section is inserted into the first housing chamber before the fitting portions are fitted to the terminal fittings. When the electronic component is inclined, the main body section comes in contact with the wall portions and it is thus possible to regulate the inclination direction of the electronic component. That is, it is possible to regulate the inclination direction of the electronic component such that the tips of the fitting portions of the terminal portions located on the inclined side are directed to the wall portions. In the terminal fittings, the plate portion (pressing destination of the spring portion) facing the spring portion is positioned inside (on the wall portion side) the proper insertion position of the fitting portion, and the spring portion is positioned outside (on the opposite side to the wall portion) the proper insertion position of the fitting portion. Accordingly, the tip of the fitting portion inclined inward is directed to the plate portion, not to the spring portion. Therefore, even when the fitting portion moves to the terminal fitting in this state, the tip thereof collides with the plate portion and it is thus possible to prevent the terminal portion (fitting portion) from colliding with the spring portion in a state in which the terminal portion departs from the proper insertion direction.

In this case, it is possible to configure that the second housing chamber includes an elastically deformable locking piece that holds the terminal fitting and that is disposed on the opposite side to the wall portion with the terminal fitting interposed therebetween.

Accordingly, since the terminal fittings can be disposed to be close to the wall portions and the spring portions of the terminal fittings can be positioned outside the plate portions, it is possible to decrease the gap between the fitting portion of each terminal portion and the side surface of the main body section and thus to decrease the size of the electronic component.

In configuring an electrical junction box including the above mentioned electronic component assembly structure, it is possible to suppress damage of the terminal fitting in the electrical junction box.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an electronic component module having an electronic component assembly structure according to an embodiment of the present invention will be described with reference to the accompanying drawings. In this embodiment, a relay is used as an electronic component, but the electronic component is not limited to the relay and may employ another electronic component having a configuration common to the relay which will be described below, such as a fuse or a module component incorporated into a substrate. The usage of the relay module according to this embodiment is not particularly limited, but a case can be considered in which the relay module is used for equipment or the like for controlling a connection state between a power supply device and an electric component in a vehicle such as an automobile. Such a type of relay module can be provided as one constituent member of an electrical junction box, but can be treated as an independent body other than a constituent member of the electrical junction box and can guarantee a relay function even as an independent body.

Figure 1:
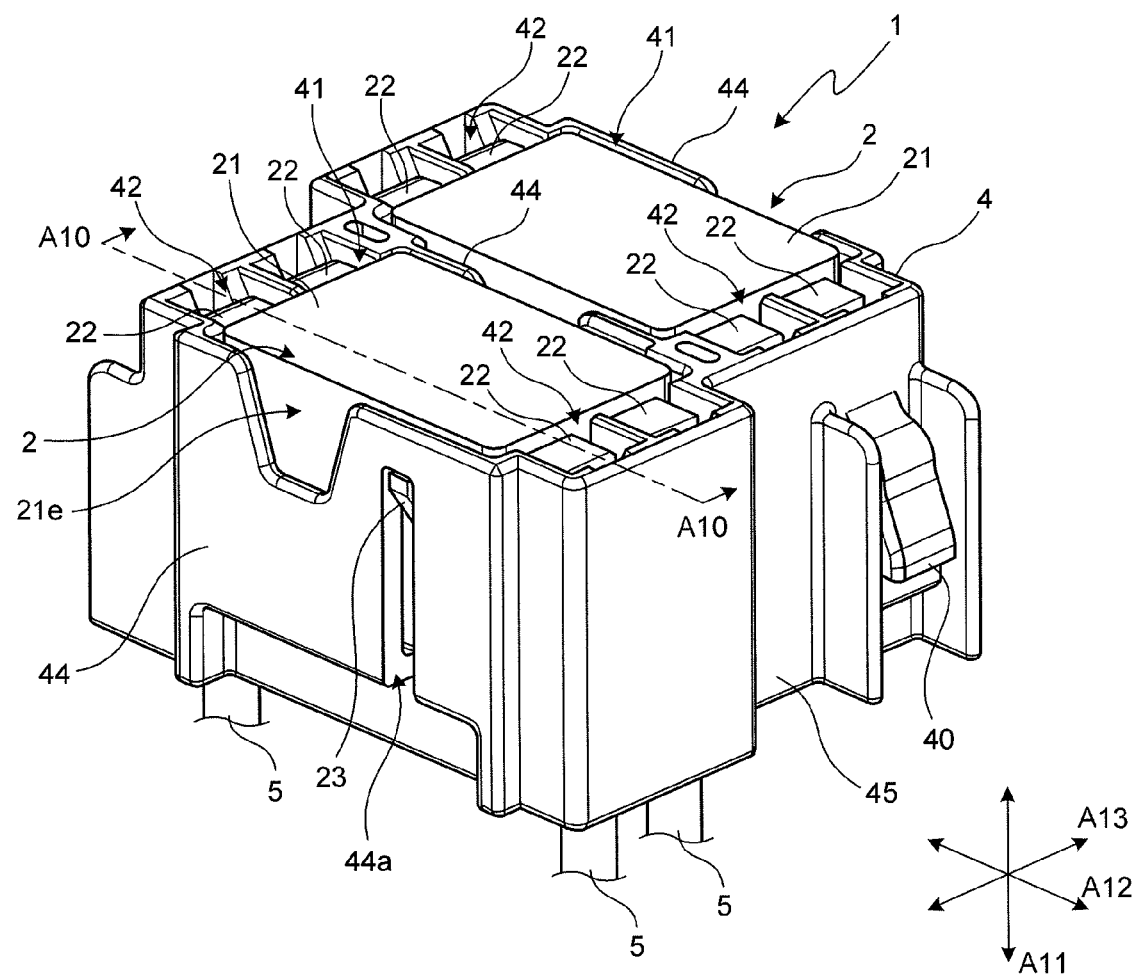
FIG. 1 is a perspective view illustrating the entire configuration of a relay module in which a relay, terminal fittings, and a housing member are mutually assembled.
Figure 2:
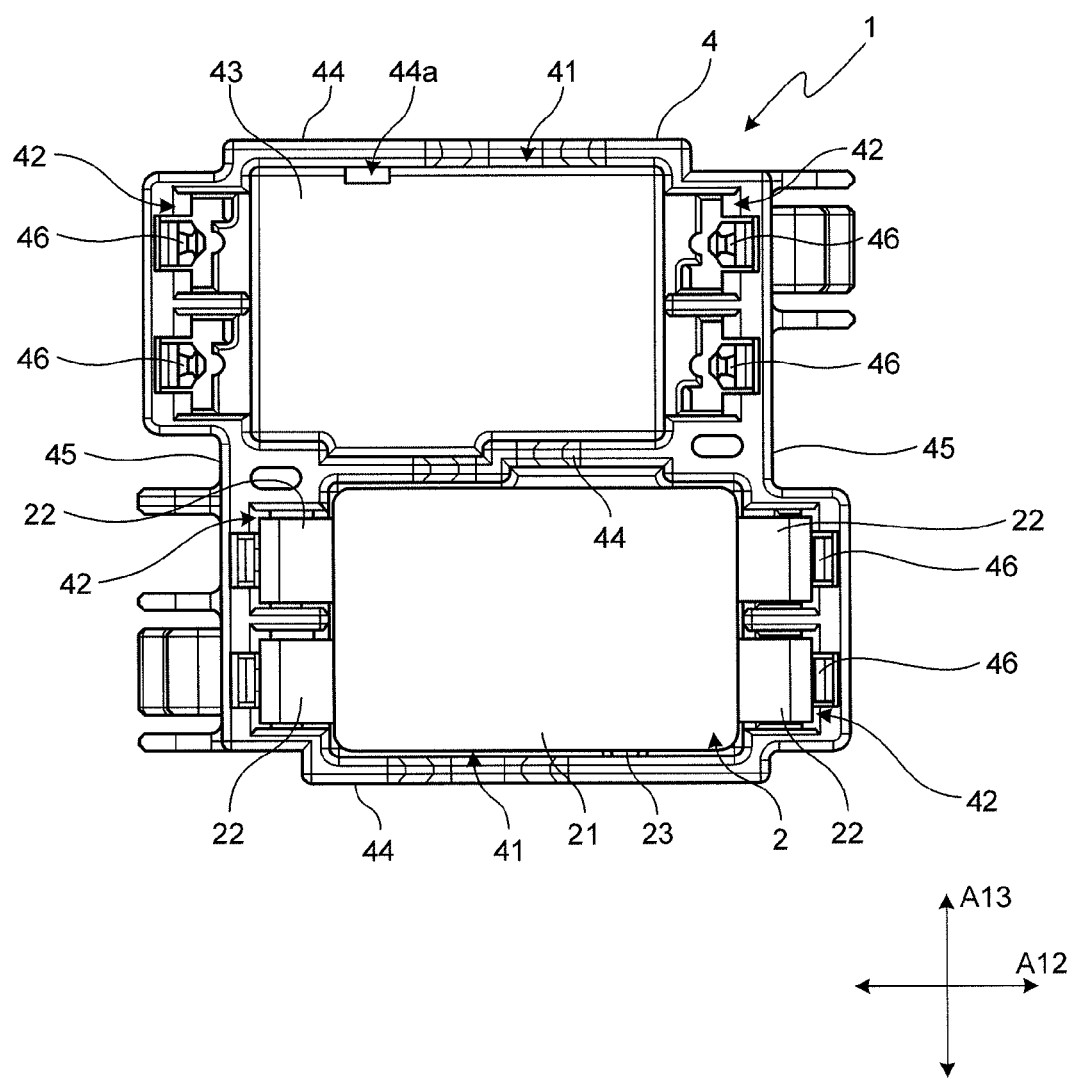
FIG. 2 is a plan view of the relay module (one of two relays is not illustrated) illustrated in FIG. 1.
Figure 3A:
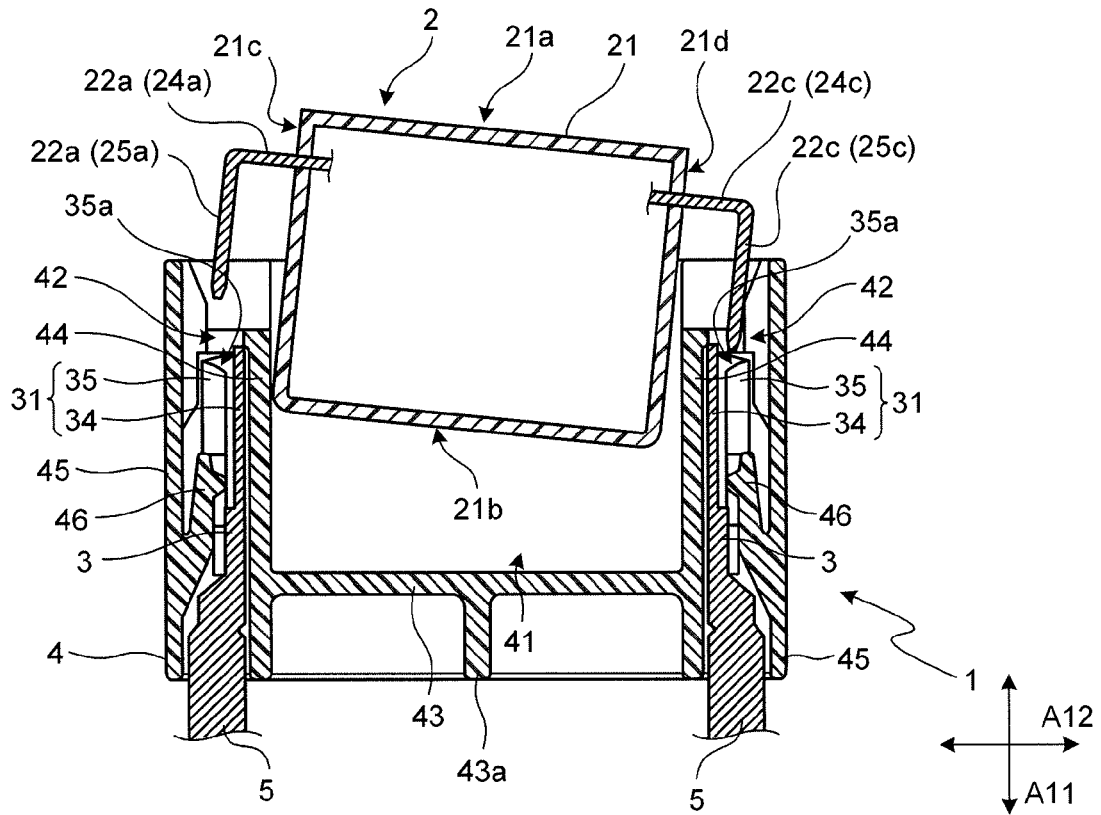
FIG. 3A is a longitudinal-sectional view of the relay module when viewed from the direction of arrow A10 in FIG. 1 and is a diagram illustrating a state in which the relay is inclined when inserting the relay into the housing member.
Figure 3B:
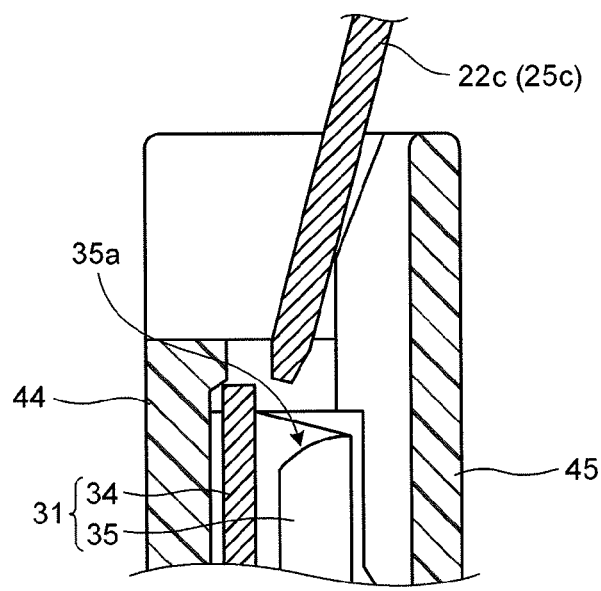
FIG. 3B is a longitudinal-sectional view of the relay module when viewed from the direction of arrow A10 in FIG. 1 and is an enlarged view illustrating a positional relationship between a tab of a relay and a terminal fitting (a plate portion and a spring portion) in FIG. 3A.
Figure 4A:
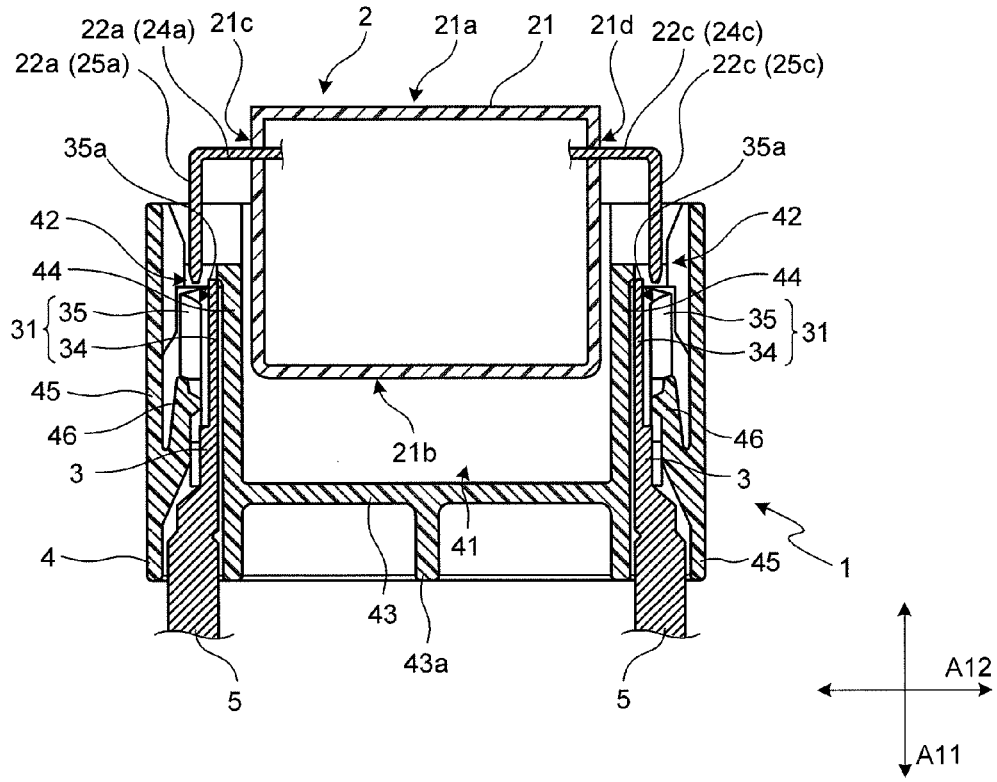
FIG. 4A is a longitudinal-sectional view of the relay module when viewed from the direction of arrow A10 in FIG. 1 and is a diagram illustrating a state in which the relay has a proper insertion posture with respect to the housing member.
Figure 4B:
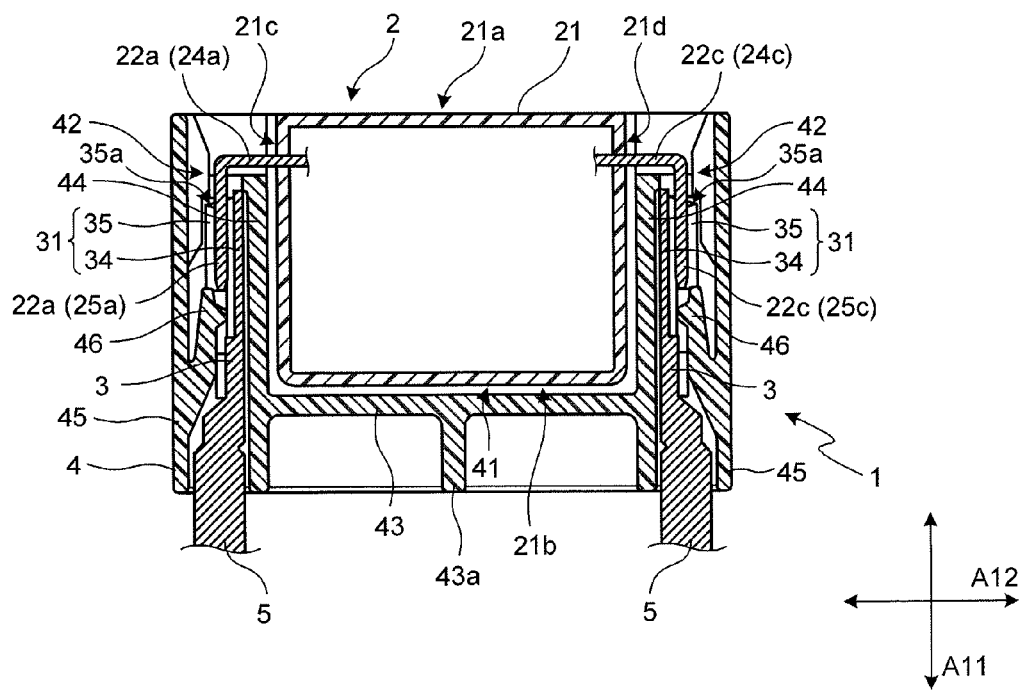
FIG. 4B is a longitudinal-sectional view of the relay module when viewed from the direction of arrow A10 in FIG. 1 and is a diagram illustrating a state in which the relay has been assembled into the housing member.

FIGS. 1 to 4 illustrate a relay assembly structure according to an embodiment of the present invention. FIG. 1 is a diagram illustrating the entire configuration of a relay module 1 in which a relay 2, terminal fittings 3, and a housing member 4 are mutually assembled. FIG. 2 is a plan view (one of two relays 2 is not illustrated) of the relay module 1 illustrated in FIG. 1. FIGS. 3 and 4 illustrate longitudinal-sections of the relay module 1 when viewed from the direction of arrow A10 in FIG. 1, where FIG. 3A is a diagram illustrating a state in which the relay 2 is inclined when inserting the relay into the housing member 4 and FIG. 3B is an enlarged view illustrating a positional relationship between a terminal portion (tab) 22 of the relay 2 and the terminal fitting 3 (a plate portion 34 and a spring portion 35) in FIG. 3A. FIG. 4A is a diagram illustrating a state in which the relay 2 has a proper insertion posture with respect to the housing member 4 and FIG. 4B is a diagram illustrating a state in which the relay 2 has been assembled into the housing member 4. In the following description, a direction indicated by arrow A11 in FIG. 1 is defined as an vertical direction, a direction indicated by arrow A12 is defined as a horizontal direction, and a direction indicated by arrow A13 is defined as a front-back direction (hereinafter, the same applies to the drawings other than FIG. 1). Regarding the vertical direction, the upward direction in FIG. 1 is defined as upward (upside) and the downward direction is defined as downward (downside). However, the vertical direction, the horizontal direction, and the front-back direction may not match the respective directions (for example, the vertical direction, the horizontal direction, and the front-back direction of a vehicle) in a state in which the relay module 1 is actually mounted on a vehicle. Various components accommodated in a relay main body 21 are not illustrated in FIGS. 3A, 4A, and 4B.

In this embodiment, the relay module 1 has a configuration in which the relay 2, the terminal fittings 3 to which the relay 2 is fitted, and the housing member 4 that accommodates the relay 2 and the terminal fittings 3 therein are mutually assembled. The relay 2 includes a main body section (hereinafter, referred to as a relay main body) 21 having a rectangular parallelepiped shape and terminal portions (hereinafter, referred to as tabs) 22 (22a to 22d) which are disposed in the relay main body 21. In this embodiment, as illustrated in FIG. 1, it is assumed that one relay module 1 includes two relays 2. However, the number of relays constituting one relay module is not particularly limited and the relay module may include only one relay or may include three or more relays. When the relay module includes a plurality of relays, only the same type of relays 2 as illustrated in FIG. 1 may be employed or another type of relays (for example, relays 2a to 2k illustrated in FIGS. 8 to 18) may be mixed.

Figure 5:
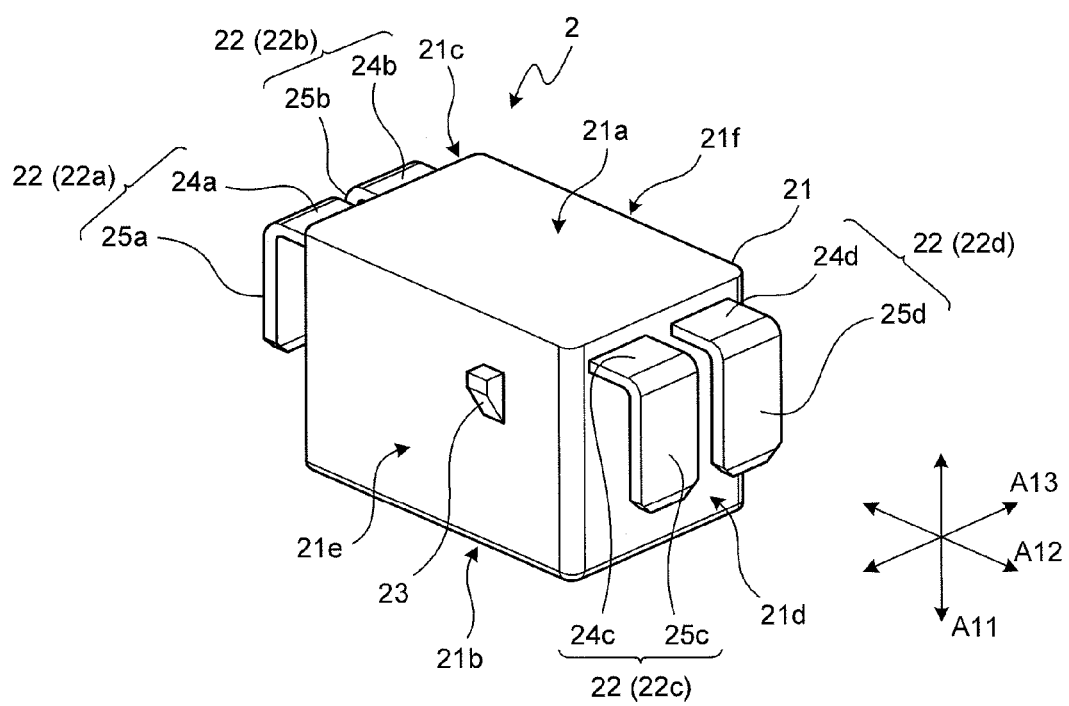
FIG. 5 is a perspective view illustrating a configuration of a relay according to an embodiment of the present invention.

FIG. 5 is a perspective view illustrating a configuration of the relay according to this embodiment. FIG. 5 illustrates an example of the relay 2 according to this embodiment. The relay 2 has a configuration in which the relay main body 21 is formed of a resin or the like and conductive metal tabs 22 are disposed in the relay main body 21. The relay main body 21 has surfaces facing each other in the vertical direction (hereinafter, referred to as a top surface 21a and a bottom surface 21b), surfaces facing each other in the horizontal direction (hereinafter, referred to as a left side surface 21c and a right side surface 21d), and surfaces facing each other in the front-back direction (hereinafter, referred to as a front surface 21e and a back surface 21f). In this case, the relay main body 21 is positioned such that the horizontal direction is set as the longitudinal direction thereof and the left side surface 21c, the right side surface 21d, the front surface 21e, and the back surface 21f are set as side surfaces. In this embodiment, the relay main body 21 is formed, for example, in a rectangular parallelepiped shape, but the relay main body may be formed in a square parallelepiped shape.

Each tab 22 includes a base end 24 (24a to 24d) protruding from the relay main body 21 and a fitting portion 25 (25a to 25d) that is fitted to the corresponding terminal fitting 3. In this case, the fitting portion 25 extends from the protruding tip of the base end 24 and droops along one side surface of the relay main body 21 with a gap from the side surface. The number of tabs 22 or the width or thickness thereof can be arbitrarily set. For example, when the relay 2 includes a plurality of tabs 22, all the tabs 22 may be set to have the same width and the same thickness or the tabs 22 may be set to have different widths or thicknesses. In each tab 22, the protruding position or the protruding length of the base end 24 from the relay main body 21, the height position of the extending tip of the fitting portion 25, the extending size from the base end 24, or the like can be arbitrarily set and is not particularly limited. Here, the fitting portion 25 extends from the protruding tip of the base end 24 such that the extending tip does not protrude from the bottom surface 21b of the relay main body 21.

As illustrated in FIG. 5, the relay 2 according to this embodiment includes four tabs 22 having a plate shape, in which two tabs 22a and 22b are arranged on the left side surface 21c of the relay main body 21 and the other two tabs 22c and 22d are arranged on the right side surface 21d. In this case, four base ends 24a to 24d protrude from the same height (positions at which the distances from the bottom surface 21b in the vertical direction are the same) by the same length (size in the horizontal direction). Four fitting portions 25a to 25d extend substantially at right angle and downward from the protruding tips of the base ends 24a to 24d and the positions of the extending tips of the fitting portions 25a to 25d are arranged at the same height.

Figure 6:
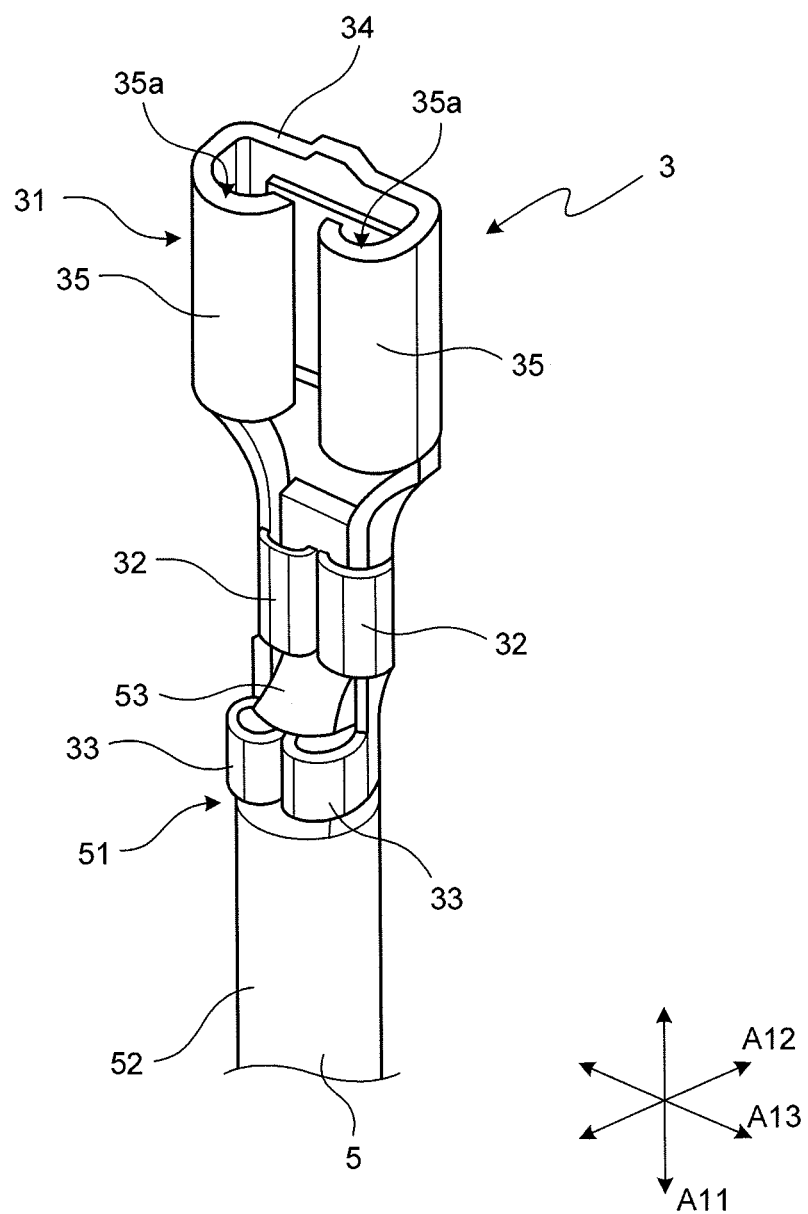
FIG. 6 is a perspective view illustrating a configuration of a terminal fitting according to an embodiment of the present invention.

FIG. 6 is a perspective view illustrating a configuration of a terminal fitting according to this embodiment. FIG. 6 illustrates an example of the configuration of the terminal fitting 3 according to this embodiment. The terminal fitting 3 is an interface member that is connected to a terminal section 51 of an electrical wire 5 so as to electrically connect the electrical wire 5 to the relay 2. The terminal fitting 3 is formed by machining a conductive metal sheet and includes a female connection portion 31 to which the fitting portion 25 of the tab 22 is fitted, a pair of core clamping pieces 32 that caulk a core wire 53 exposed by peeling an insulating coating 52 of the terminal section 51 of the electrical wire 5, and a pair of external clamping pieces 33 that caulk a tip of the insulating coating 52 of the electrical wire 5.

The connection portion 31 includes a flat plate portion 34 that supports the fitting portion 25 of the fitted tab 22 and the spring portion 35 that presses the fitting portion 25 and is configured to fit the fitting portion 25, which is pressed against the plate portion 34 by the spring portion 35, between the plate portion 34 and the spring portion 35. The spring portion 35 is formed in a pair of convex shapes by causing both ends in the front-back direction of the plate portion 34 to rise upright and curving the tips thereof toward the vicinity of the center in the front-back direction of the plate portion 34. Accordingly, the spring portion 35 is configured to apply a pressing force (elastic restoration force) to the fitting portion 25 to be able to fit the fitting portion 25 by elastically deforming the tips thereof in a direction in which it is separated from the plate portion 34.

The spring portion 35 includes an inclination portion 35a guiding the fitting portion 25, and the inclination portion 35a is formed to be inclined from the outside to the inside (from a frame portion 45 to a wall portion 44 in the housing member 4 to be described later) in the fitting direction (downward direction of the vertical direction) of the fitting portion 25. In this embodiment, the inclination portion 35a is formed by inclining the top end face of the spring portion 35 such that the spring portion 35 smoothly moves downward from a position most protruding from the plate portion 34 to the plate portion 34. Accordingly, the inclination portion 35a can guide the fitting portion 25 to a position between the plate portion 34 and the spring portion 35 when fitting the fitting portion 25 of the tab 22 to the connection portion 31.

Figure 7:
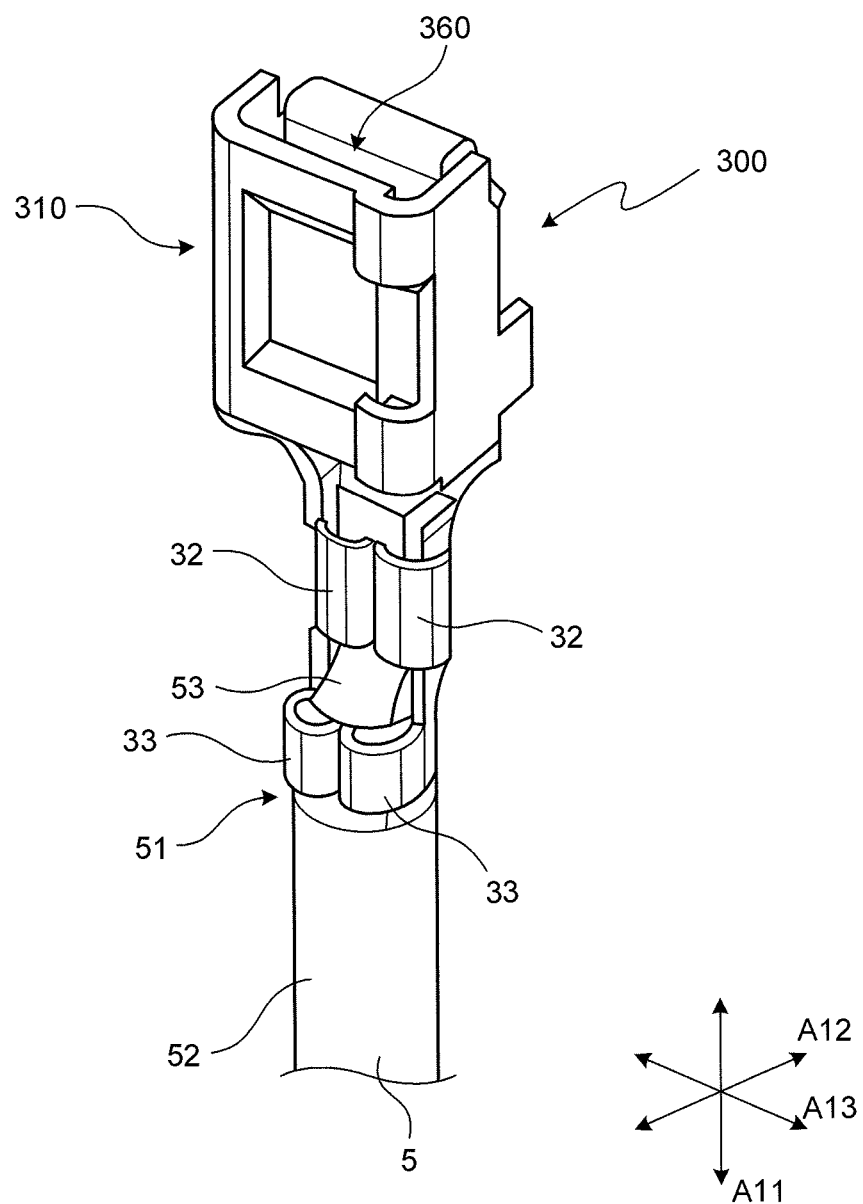
FIG. 7 is a perspective view illustrating another configuration of the terminal fitting.

FIG. 6 illustrates an example of the terminal fitting 3 in which the connection portion 31 is called a fastening type, but the terminal fitting 3 is not limited to this type. For example, like a terminal fitting 300 according to a modification example illustrated in FIG. 7, a connection portion 310 may be configured to have a substantially tubular shape, to provide the inside of a tubular portion 360 with a plate-like spring portion, and to press the fitting portion 25 of the tab 22 against the inner wall of the tubular portion 360 with the spring portion to be able to fit the fitting portion to the connection portion. FIG. 7 is a perspective view illustrating another configuration of the terminal fitting. In this case, the spring portion of the terminal fitting 300 is formed such that the pressing direction of the fitting portion 25 is directed to the wall portion 44 of the housing member 4. In the terminal fitting 300 illustrated in FIG. 7, the same elements as in the terminal fitting 3 (FIG. 6) are referenced by the same reference numerals in the drawings. In FIGS. 6 and 7, the configuration in which the terminal fitting 3 or 300 is connected to the terminal section 51 of the electrical wire 5 is illustrated as an example, but the terminal fitting 3 or 300 can be connected to a connecting substrate, a connector, or the like.

The housing member 4 is a resinous casing for accommodating and holding the relay 2 and the terminal fittings 3 and includes a first housing chamber 41 that guides and accommodates the relay main body 21 therein and a second housing chamber 42 that accommodates and holds the terminal fittings 3 therein. In this embodiment, the housing member 4 is treated as a single member which is independent of the electrical junction box. Accordingly, a locking portion 40 that can engage with a locked portion (for example, locking groove) formed in a casing of the electrical junction box so as to attach the housing member to the casing of the electrical junction box is formed to protrude from the housing member 4. By causing the locking portion 40 to engage with the locked portion, the housing member 4 can be locked and attached to the casing of the electrical junction box. Here, the housing member 4 can be formed as a part of the casing of the electrical junction box and can be treated as a unified body so as not to be detached from the electrical junction box. The numbers of relays 2 and terminal fittings 3 which are accommodated in the housing member 4 are not particularly limited. In this embodiment, as illustrated in FIG. 1, the configuration in which two relays 2 are accommodated in one housing member 4 is assumed. In other words, the housing member 4 includes two sets of relay accommodating spaces including one first housing chamber 41 and two second housing chambers 42. Since each relay 2 is provided with four tabs 22, eight terminal fittings 3 are accommodated in one housing member 4. Since two tabs 22 are disposed on each of the left side surface 21c and the right side surface 21d of the relay main body 21, a pair of second housing chambers 42 are disposed to face each other in the housing member 4 with the first housing chamber 41 interposed therebetween and two terminal fittings 3 are accommodated and held in each second housing chamber 42.

As illustrated in FIG. 4B, the height position of the relay main body 21 in a state in which the relay 2 is assembled into the housing member 4 is determined depending on the positions at which the fitting portions 25 of the tabs 22 are fitted to the connection portions 31 of the terminal fittings 3. That is, each terminal fitting 3 is held in the second housing chamber 42 at height positions (the same height) at which the connection portion 31 to which the fitting portion 25 of the tab 22 is fitted faces the side surface (the left side surface 21c and the right side surface 21d) of the relay main body 21 accommodated in the first housing chamber 41 with the wall portions 44 interposed therebetween. The top end face of the wall portion 44 is positioned at a predetermined height below the top end face of the frame portion 45 so as not to come in contact with the base ends 24 of the tabs 22 when the fitting portions 25 of the tabs 22 are fitted to the connection portions 31 of the terminal fittings 3, and a bottom portion 43 thereof is positioned at a predetermined height which does not come in contact with the bottom surface 21b of the relay main body 21. Accordingly, since the relay 2 is held in the housing member 4 without interfering with the bottom portion 43 or the top end face of the wall portion 44 except for parts in which the fitting portions 25 of the tabs 22 are fitted to the connection portions 31 of the terminal fittings 3 in the height direction of the housing member 4, it is possible to satisfactorily connect the tabs 22 to the terminal fittings 3 and thus to stabilize the holding force of the relay 2.

Four sides of the first housing chamber 41 are surrounded with a wall portion 44 that rises upright from the bottom portion 43 to form a recessed space of which the top is opened to the outside as illustrated in FIGS. 1 to 4. The wall portion 44 rises upward from the bottom portion 43 so as to surround the side surfaces (the left side surface 21c, the right side surface 21d, the front surface 21e, and the back surface 21f) of the relay main body 21 along the side surfaces and guides and accommodates the relay main body 21 into the first housing chamber 41. In this case, the first housing chamber 41 has a substantially rectangular parallelepiped shape larger than the relay main body 21 so as to smoothly accommodate the relay main body 21 guided by the wall portion 44.

As illustrated in FIG. 1, a locking groove 44a for engaging with a protrusion 23 formed on the front surface 21e is formed on the wall portion 44 rising upright to face the front surface 21e of the relay main body 21. Accordingly, in a state in which the relay main body 21 is accommodated in the first housing chamber 41, the protrusion 23 can engage with the locking groove 44a to lock the relay main body 21 to the first housing chamber 41. That is, the assembling force between the relay 2 and the housing member 4 due to the fitting of the tabs 22 and the terminal fittings 3 can be complemented using the engagement between the protrusion 23 and the locking groove 44a. If the complement is not necessary, the protrusion 23 and the locking groove 44a may be skipped. As illustrated in FIGS. 3A, 4A, and 4B, the bottom portion 43 may be provided with a reinforcing rib 43a protruding downward.

The second housing chambers 42 are disposed outside the first housing chamber 41 with the wall portion 44 interposed therebetween, are surrounded with rectangular tubular frames formed by the wall portion 44 and the frame portion 45 of the housing member 4, and forms a rectangular parallelepiped space of which the top and the bottom are opened to the outside. The second housing chambers 42 are provided with an elastically deformable locking piece (hereinafter, referred to as a lance) 46 for holding each terminal fitting 3 on the opposite side (the frame portion 45 side) to the wall portion 44 with the terminal fittings 3 interposed therebetween.

The lance 46 is formed of the same resin as the housing member 4 and extends in a cantilever shape from the frame portion 45 to the terminal fitting 3, specifically, the spring portion 35. That is, the lance 46 constitutes a so-called spring mechanism, and achieves fixation of the terminal fitting 3 to the second housing chamber 42 and holds the terminal fitting 3 in the second housing chamber 42 by pressing and locking the lower edge of the spring portion 35 with a restoration force from the elastic deformation. As illustrated in FIGS. 3A, 4A, and 4B, each terminal fitting 3 is held such that the pressing direction of the spring portion 35 is directed to the wall portion 44.

Figure 20A:
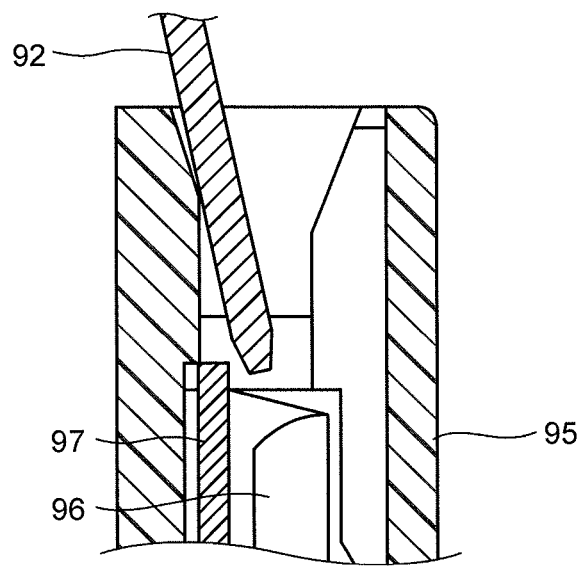
FIG. 20A is an enlarged view illustrating a positional relationship between a relay terminal and a terminal fitting (a plate portion and a spring portion) in the relay module according to the related art.
Figure 20B:
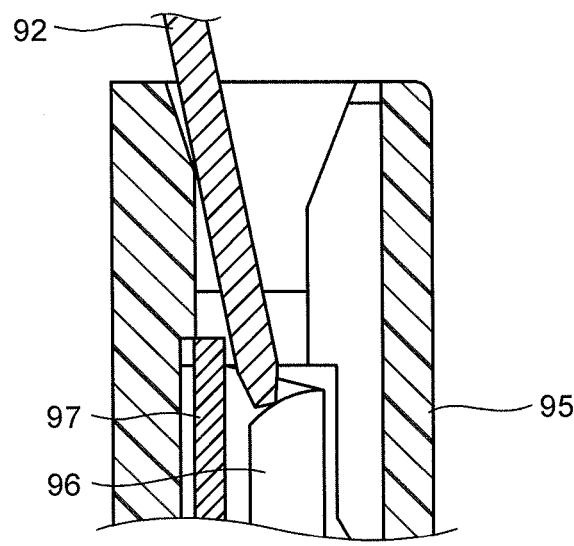
FIG. 20B is an enlarged view illustrating a positional relationship between the relay terminal and the terminal fitting (a plate portion and a spring portion) in the relay module according to the related art.

The relay 2 is assembled into the housing member 4 in a state in which the terminal fittings 3 are held in the second housing chambers 42. When the relay 2 has a proper insertion posture (a posture in which the relay 2 is not inclined and extends in the vertical direction as illustrated in FIG. 4A) with respect to the housing member 4 in fitting the tabs 22 to the terminal fittings 3, the tabs 22 can be directed in the proper insertion direction (downward direction in the vertical direction in FIG. 4A) with respect to the terminal fittings 3. Accordingly, the tabs 22 do not move toward the terminal fittings 3 in a state in which the extending tips thereof are directed to the spring portions 35 (see FIG. 20A), and do not collide with the spring portions 35 in a state in which the tabs 22 depart from the proper insertion direction (see FIG. 20B). Furthermore, in this embodiment, even when the relay 2 is inclined in assembling the relay into the housing member 4, it is possible to prevent the extending tips of the fitting portions 25 from departing from the proper insertion direction and colliding with the spring portions 35 (the state illustrated in FIG. 20B).

In this embodiment, since each tab 22 has a configuration in which the fitting portion 25 droops along the side surface of the relay main body 21 with a gap from the side surface, the relay main body 21 is inserted into the first housing chamber 41 before the fitting portions 25 are fitted to the terminal fittings 3. Accordingly, when the relay 2 is inclined, the relay main body 21 can come in contact with the wall portion 44 to regulate the inclination direction of the relay 2. That is, the inclination direction of the relay 2 is regulated such that the extending tip of the fitting portion 25 of the tab 22 which is located on the inclined side is directed to the wall portion 44 of the housing member 4. For example, when the relay 2 is inclined as illustrated in FIG. 3A, the fitting portion 25c of the tab 22c located on the inclined side is inclined to the outside (the frame portion 45 side of the housing member 4) and the extending tip thereof is directed to the inside (the wall portion 44 side of the housing member 4). On the other hand, since the terminal fittings 3 are held such that the pressing direction of the spring portion 35 is directed to the wall portion 44, the spring portion 35 can be positioned outside (on the frame portion 45 side) the proper insertion position (gap between the plate portion 34 and the spring portion 35) of the fitting portion 25c, and the plate portion 34 can be positioned inside (on the wall portion 44 side) the proper insertion position. Accordingly, the extending tip of the fitting portion 25c inclined inward can be directed to the plate portion 34, not to the spring portion 35, as illustrated in FIG. 3B. As a result, even when the fitting portion 25c moves ahead in this state, the extending tip thereof collides with the plate portion 34 and can be prevented from colliding with the spring portion 35 as in the state illustrated in FIG. 20B. On the other hand, since the relay main body 21 is inserted into the first housing chamber 41 and the inserted relay main body 21 is guided along the wall portion 44 as illustrated in FIG. 3A, the relay 2 can be made to have the proper insertion posture with respect to the housing member 4 as illustrated in FIG. 4A even in the inclined state and the tab 22c can be directed in the proper insertion direction with respect to the terminal fitting 3. Therefore, according to this embodiment, even when the relay 2 is inclined in fitting the tabs 22 to the terminal fittings 3, it is possible to prevent the tab 22 from colliding with the spring portions 35 (see FIG. 20B) in a state in which the tab departs from the proper insertion direction and thus to suppress damage such as deformation from occurring in the spring portion 35.

When the relay 2 is inclined as illustrated in FIG. 3A, the extending tip of the fitting portion 25a of the tab 22a located on the opposite side to the inclined side is directed to the spring portion 35 (the outside), not to the plate portion 34 (the inside). However, as described above, since the relay main body 21 is guided along the wall portion 44 and the relay 2 is made to have a proper insertion posture with respect to the housing member 4 as illustrated in FIG. 4A, it is possible to direct the tab 22a in the proper insertion direction when inserting the fitting portion 25a into the terminal fitting 3. Accordingly, it is possible to prevent the tab 22a as well as the tab 22c from colliding with the spring portion 35 (see FIG. 20B) in a state in which the extending tip of the fitting portion 25a departs from the proper insertion direction and thus to suppress damage of the spring portion 35. Even when the relay 2 is inclined to the opposite side to the side illustrated in FIG. 3A, the fitting portions 25a and 25c can be prevented from colliding with the spring portions 35 in the same way except that the tab 22a and the tab 22c move in the opposite directions and it is thus possible to suppress damage of the spring portions 35. The tabs 22b and 22d in assembling the relay 2 into the housing member 4 move in the same way as the tabs 22a and 22c and are not different from each other in operational effects. According to this embodiment, it is possible to assemble the relay 2 into the housing member 4 while preventing damage of the spring portions 35 in this way (the state illustrated in FIG. 4B).

In this embodiment, since the lance 46 is not disposed between the terminal fitting 3 and the wall portion 44 but the lance 46 is disposed between the terminal fitting 3 and the frame portion 45, it is possible to decrease the space between the terminal fitting 3 and the wall portion 44. Accordingly, since the terminal fittings 3 can be arranged close to the wall portion 44 and the spring portions 35 of the terminal fittings 3 can be positioned outside (on the frame portion 45 side) the plate portions 34, the fitting portions 25 of the tabs 22 can be fitted to the terminal fittings 3 in the vicinity of the side surfaces of the relay main body 21. As a result, it is possible to decrease the protruding length of the base ends 24 from the side surfaces of the relay main body 21 and thus to decrease the gap between the side surfaces and the fitting portions 25. Accordingly, it is possible to reduce the size of the relay 2 and thus to achieve a decrease in cost due to a decrease in size and weight of the relay module 1 or a decrease in an amount of material. In this embodiment, since the protruding lengths of the base ends 24 on both sides of the horizontal direction can be decreased, it is possible to minimize the dimension of the relay 2 in the horizontal direction and thus to achieve a decrease in size of the relay 2.

Figure 18A:
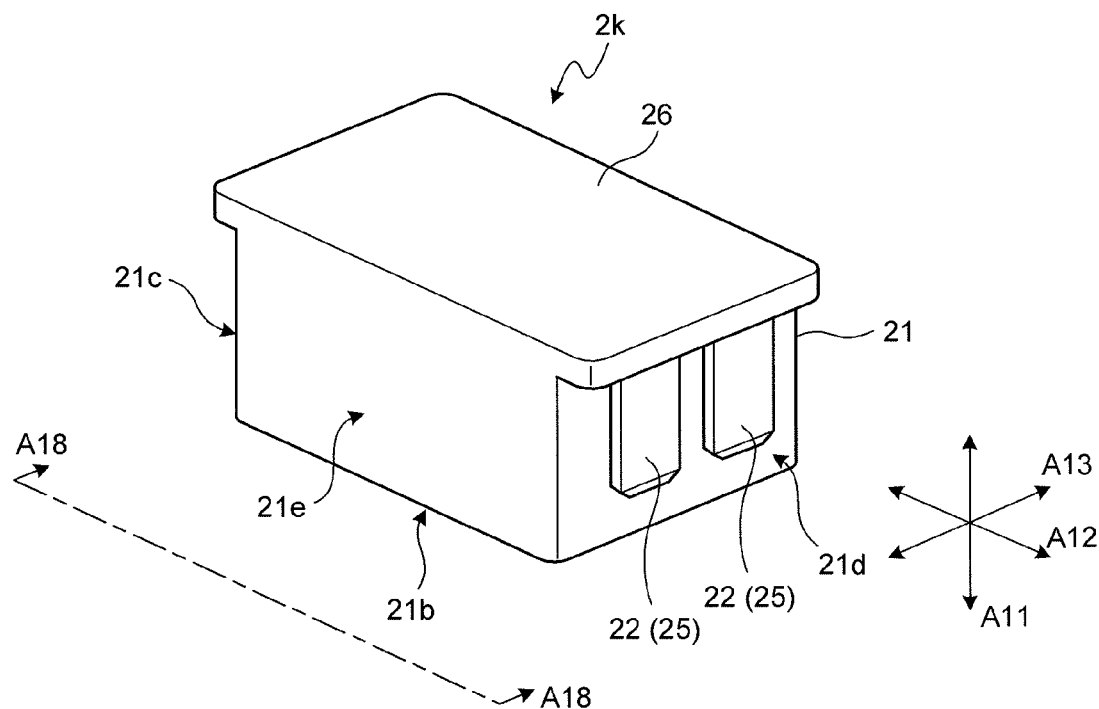
FIG. 18A is a perspective view illustrating the entire configuration of a relay according to an eleventh modification example.
Figure 18B:
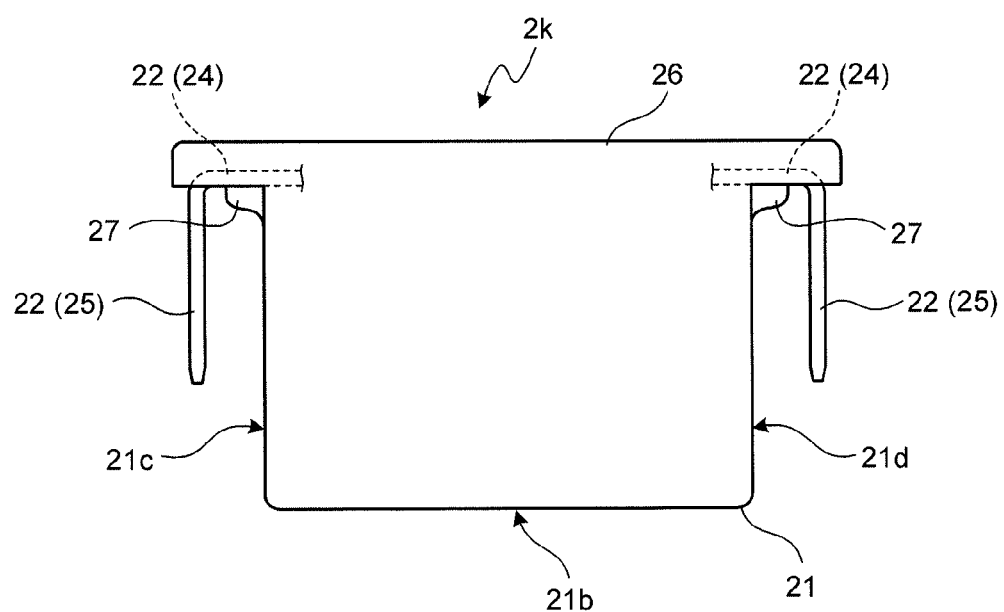
FIG. 18B is a view illustrating a configuration of the relay according to the eleventh modification example when viewed from the direction of arrow A18 in FIG. 18A.
Figure 19:
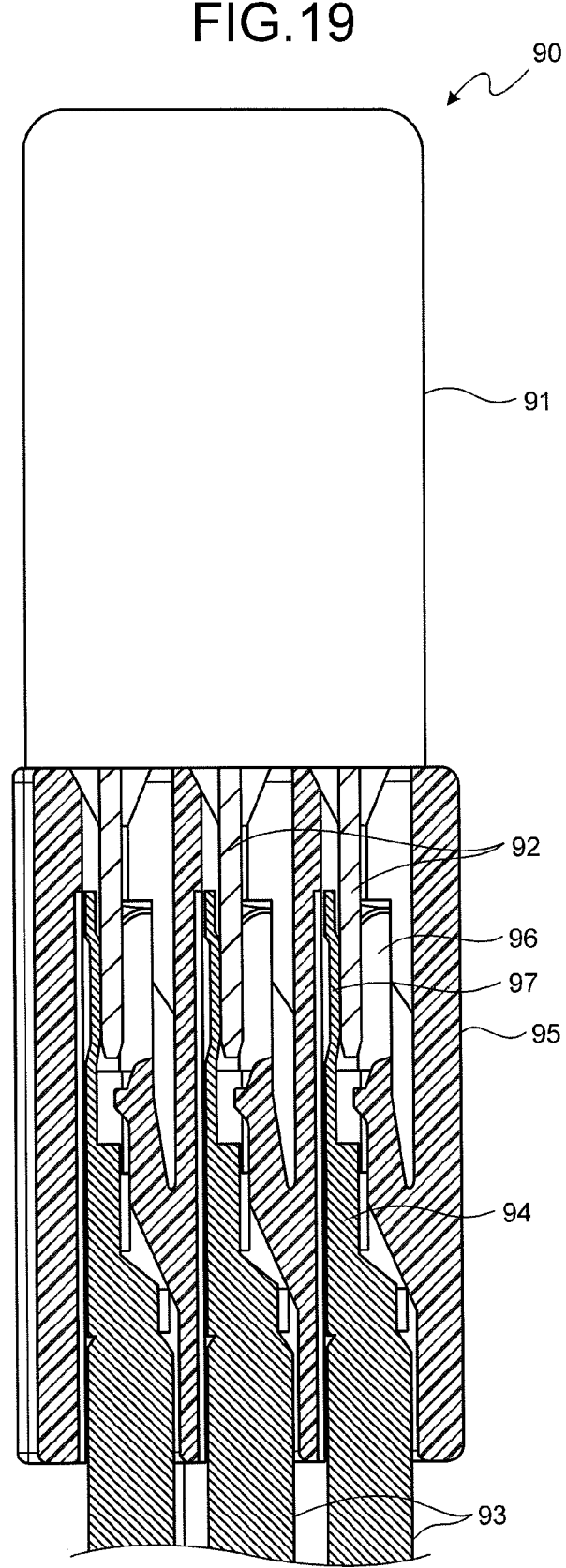
FIG. 19 is a longitudinal-sectional view illustrating a relay module according to the related art.

The configuration of the relay according to the present invention is not limited to the configuration illustrated in FIG. 5, as long as each tab 22 is configured to include a fitting portion 25 drooping along a side surface of the relay main body 21 having a rectangular parallelepiped shape with a gap from the side surface. For example, relay configurations according to first to eleventh modification examples illustrated in FIGS. 8 to 18B may be employed. Even when these modification examples are employed, the same operational effects as in the relay 2 can be achieved. FIGS. 8 to 17 are perspective views illustrating configurations of relays according to the first to tenth modification examples and FIGS. 18A and 18B are perspective views illustrating a configuration of a relay according to the eleventh modification examples.

The relay configurations according to the first to eleventh modification examples will be described below. The basic configurations of the relays according to the modification examples are the same as the relay 2 according to this embodiment. Accordingly, elements equal or similar to those in this embodiment will be referenced by the same reference numerals in the drawings, description thereof will not be repeated, and differences from the relay 2 will be described below. When the relay configurations according to the modification examples are employed, the terminal fittings 3 and the housing member 4 may be configured to correspond to the relay configurations (specifically, the arrangement of the tabs of the relays) such that the first housing chamber 41 and the second housing chambers 42 are disposed in the housing member 4, that is, the positions of the second housing chambers 42 relative to the first housing chamber 41 are set and the terminal fittings 3 are held to direct the pressing directions of the spring portions 35 to the wall portion 44. In any modification example, the number of tabs 22 and the width or thickness thereof can be arbitrarily set and the protruding positions or protruding lengths of the base ends 24, the height position of the extending tips of the fitting portions 25, the extending lengths of the fitting portions from the base ends 24, and the like can be arbitrarily set. For example, these settings may be the same for all the tabs 22 or may be different depending on the tabs 22 in the modification examples.

In the relay configuration illustrated in FIG. 5, the base ends 24 of the tabs 22 protrude from a pair of side surfaces (the left side surface 21c and the right side surface 21d) located in the longitudinal direction (the horizontal direction) of the relay main body 21, but the base ends 24 may protrude from only one side surface, from two neighboring side surfaces, or from more side surfaces like the relay configurations illustrated in FIGS. 8 to 12.

Figure 8:
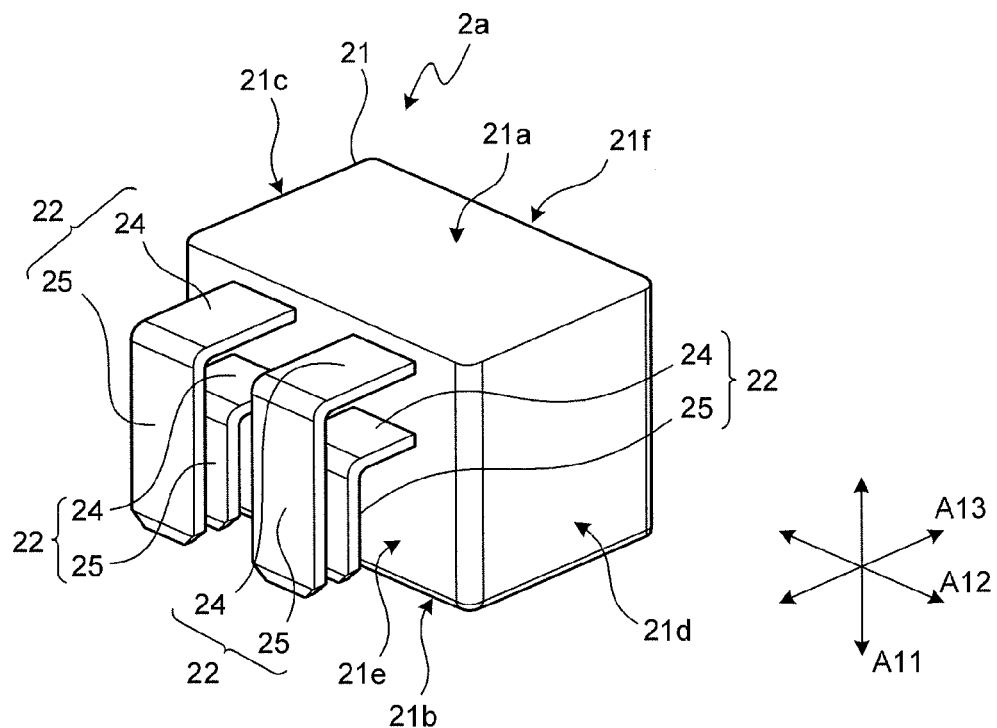
FIG. 8 is a perspective view illustrating a configuration of a relay according to a first modification example.
Figure 9:
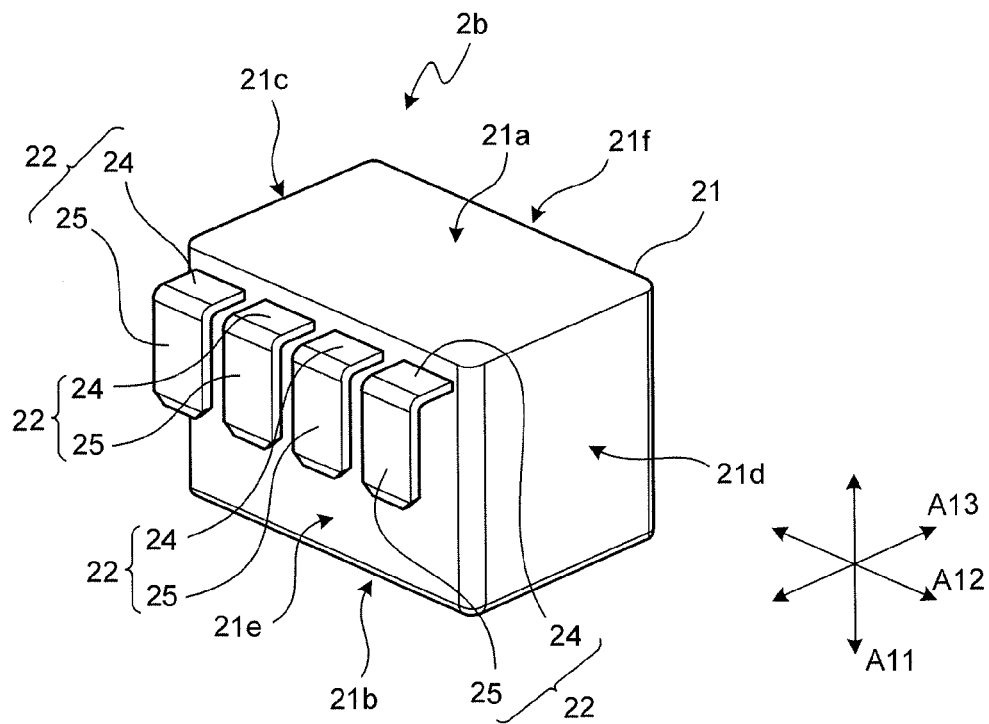
FIG. 9 is a perspective view illustrating a configuration of a relay according to a second modification example.

FIGS. 8 and 9 illustrate the configurations of the first modification example and the second modification example in which the base ends 24 of the tabs 22 protrude from only one side surface (the front surface 21e) of the relay main body 21. In the relay 2a according to the first modification example illustrated in FIG. 8, the base ends 24 of two tabs 22 among four tabs 22 protrude from the vicinity of the top end on the front surface 21e and the base ends 24 of the other two tabs 22 protrude from a lower height position. On the other hand, in the relay 2b according to the second modification example illustrated in FIG. 9, the base ends 24 of four tabs 22 protrude from the same height position in the vicinity of the top end on the front surface 21e.

Figure 10:
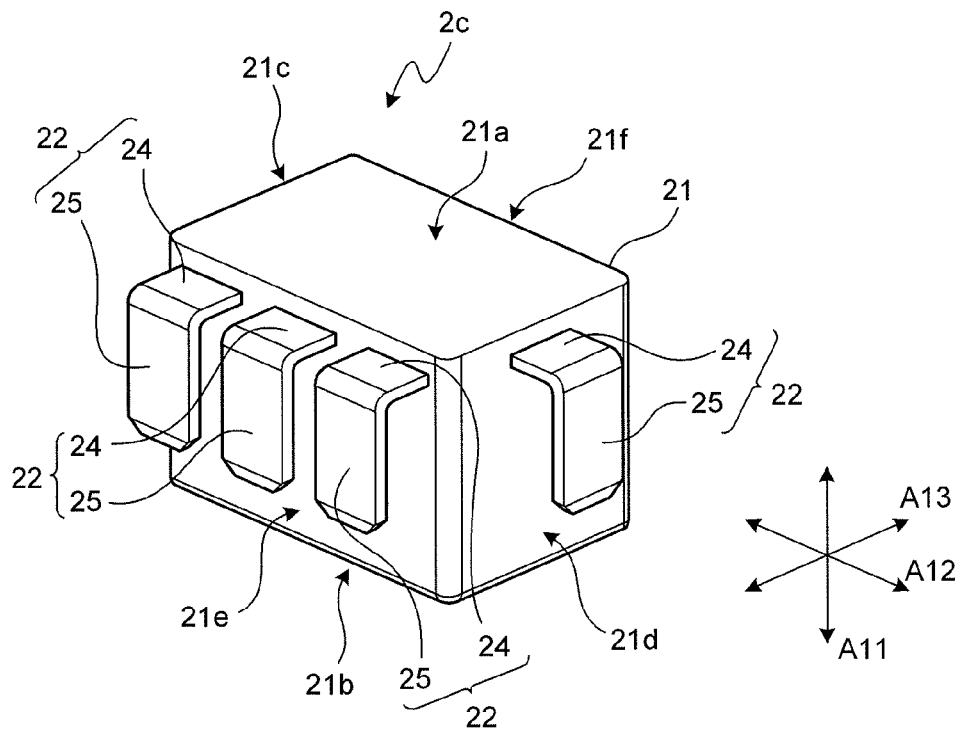
FIG. 10 is a perspective view illustrating a configuration of a relay according to a third modification example.
Figure 11:
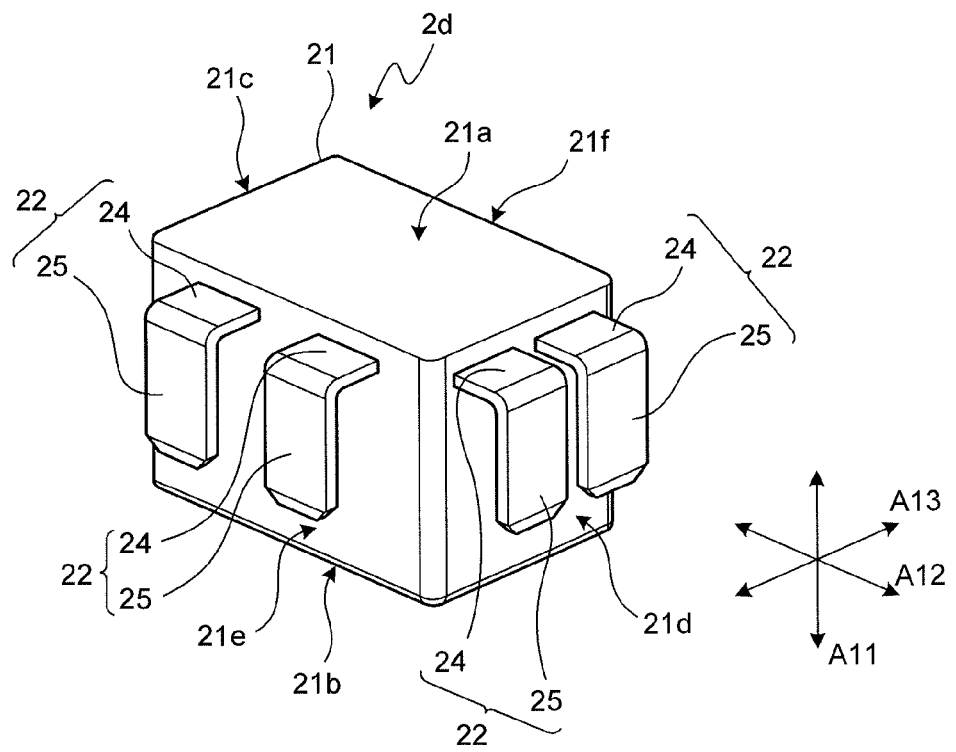
FIG. 11 is a perspective view illustrating a configuration of a relay according to a fourth modification example.

FIGS. 10 and 11 illustrate the configurations of the third modification example and the fourth modification example in which the base ends 24 of the tabs 22 protrude from two neighboring side surfaces (the front surface 21e and the right side surface 21d) of the relay main body 21. In the relay 2c according to the third modification example illustrated in FIG. 10, the base ends 24 of three tabs 22 among four tabs 22 protrude from the vicinity of the top end on the front surface 21e and the base end 24 of the other one tab 22 protrudes at the same height from the right side surface 21d. On the other hand, in the relay 2d according to the fourth modification example illustrated in FIG. 11, the base ends 24 of two tabs 22 among four tabs 22 protrude from the vicinity of the top end on the front surface 21e and the base ends 24 of the other two tabs 22 protrude at the same height from the right side surface 21d.

Figure 12:
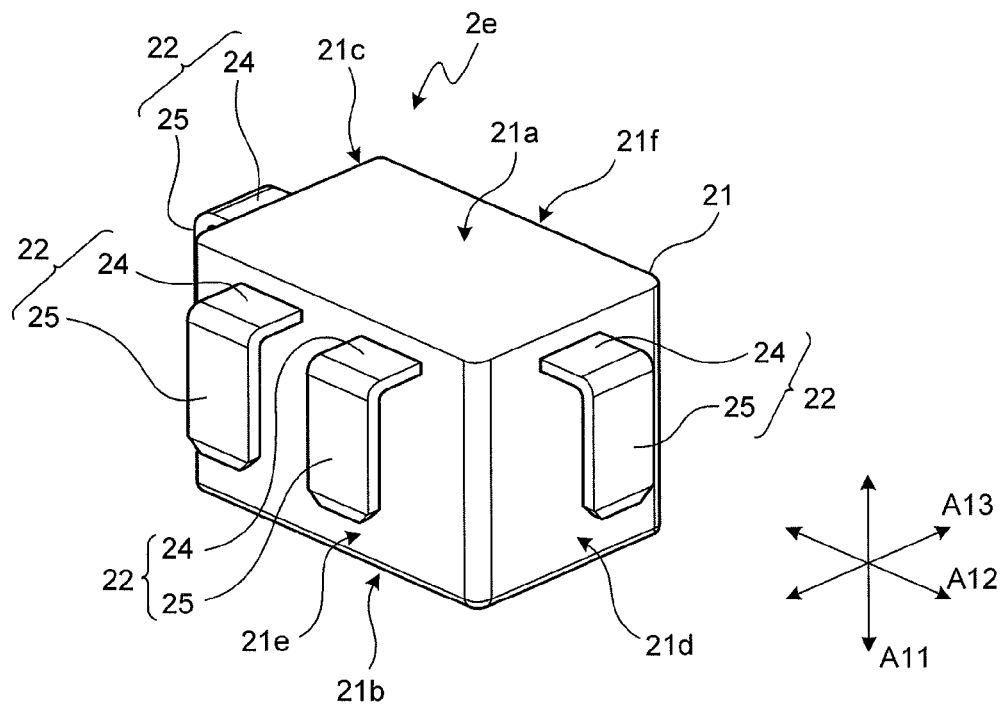
FIG. 12 is a perspective view illustrating a configuration of a relay according to a fifth modification example.

FIG. 12 illustrates the configuration of the fifth modification example in which the base ends 24 of the tabs 22 protrude from three side surfaces (the left side surface 21c, the front surface 21e, and the right side surface 21d) of the relay main body 21. In the relay 2e according to the fifth modification example, among four tabs 22, one tab protrudes from the left side surface 21c, two tabs protrude from the front surface 21e, and one tab protrudes from the right side surface 21d.

In the first to fifth modification examples (FIGS. 8 to 12), the fitting portions 25 of four tabs 22 are bent substantially at right angle and downward from the protruding tips of the base ends 24 and extend to be parallel to the side surfaces from which the base ends 24 protrude. Here, the fitting portions 25 extend by the same dimension from the base ends 24 such that the positions (heights) of the extending tips thereof in the vertical direction are equal to each other. The neighboring tabs 22 on the same side surface are arranged at a constant interval (which may differ).

In the relay configurations illustrated in FIG. 5 and FIGS. 8 to 12, the base ends 24 of the tabs 22 protrude from the side surfaces of the relay main body 21, but the base ends 24 may protrude from the top surface 21a of the relay main body 21 as in the sixth to tenth modification examples illustrated in FIGS. 13 to 17. In the sixth to tenth modification examples, the base ends 24 of four tabs 22 protrude from the top surface 21a and are bent substantially at right angle and extend to the side surfaces. The fitting portions 25 of the tabs 22 are bent substantially at right angle and downward from the base ends 24 and extend by the same dimension from the base ends 24 such that the positions (heights) of the extending tips thereof in the vertical direction are the same.

Figure 13:
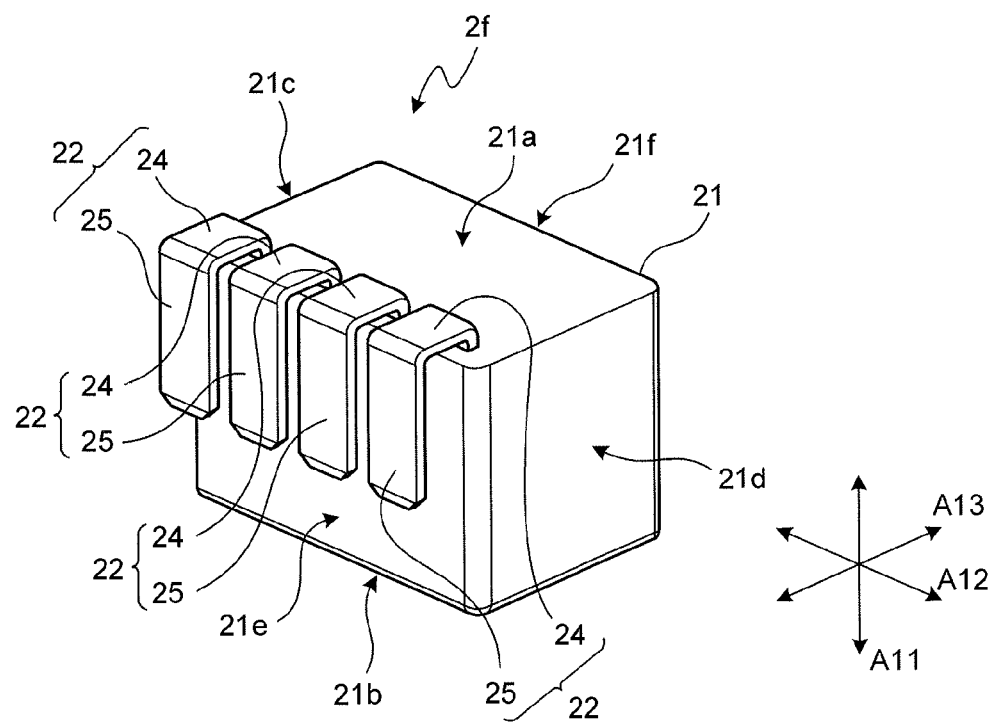
FIG. 13 is a perspective view illustrating a configuration of a relay according to a sixth modification example.
Figure 14:
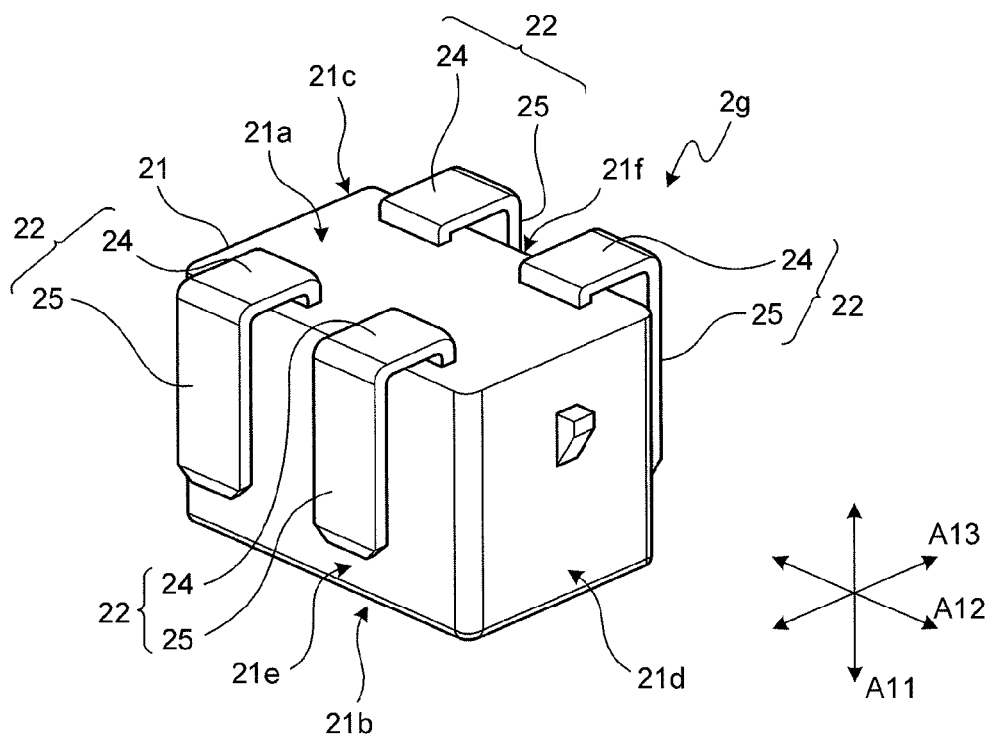
FIG. 14 is a perspective view illustrating a configuration of a relay according to a seventh modification example.
Figure 15:
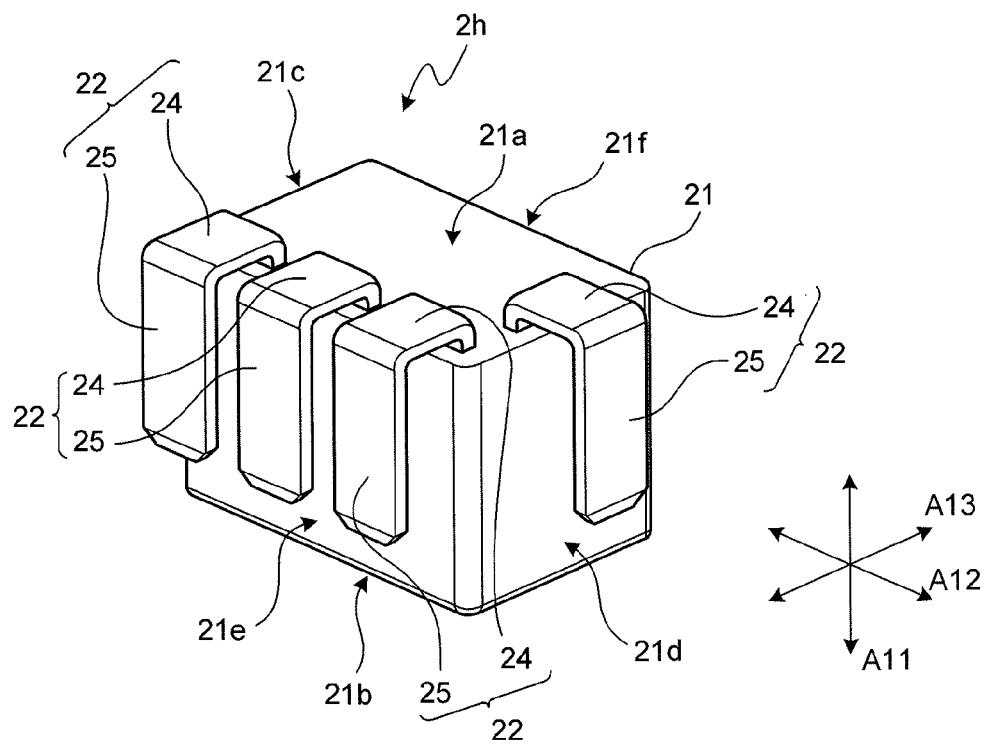
FIG. 15 is a perspective view illustrating a configuration of a relay according to an eighth modification example.
Figure 16:
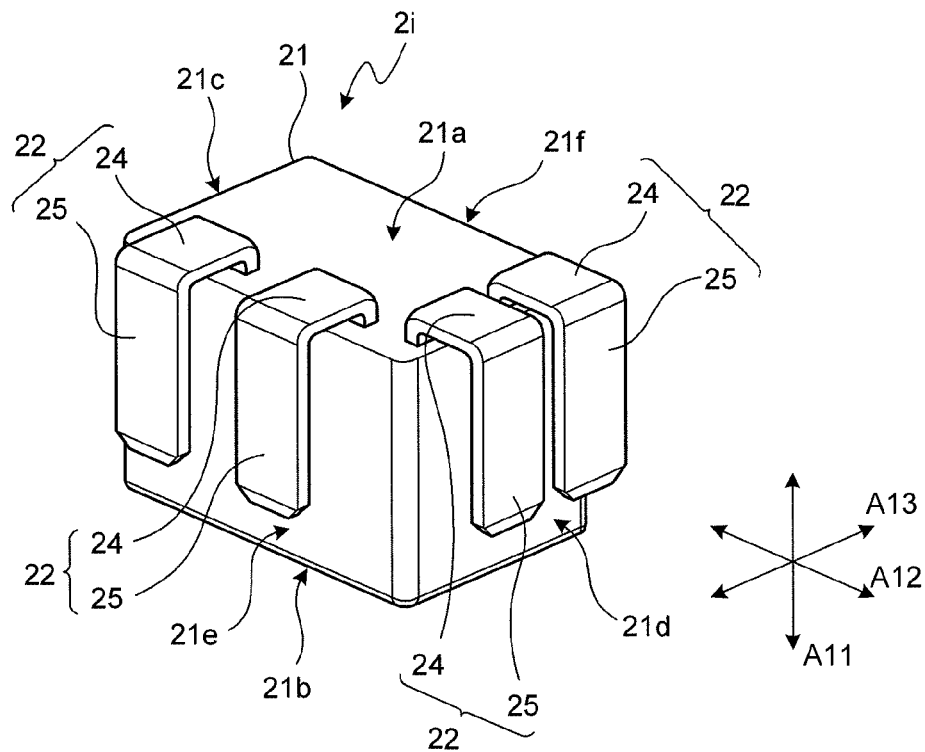
FIG. 16 is a perspective view illustrating a configuration of a relay according to a ninth modification example.
Figure 17:
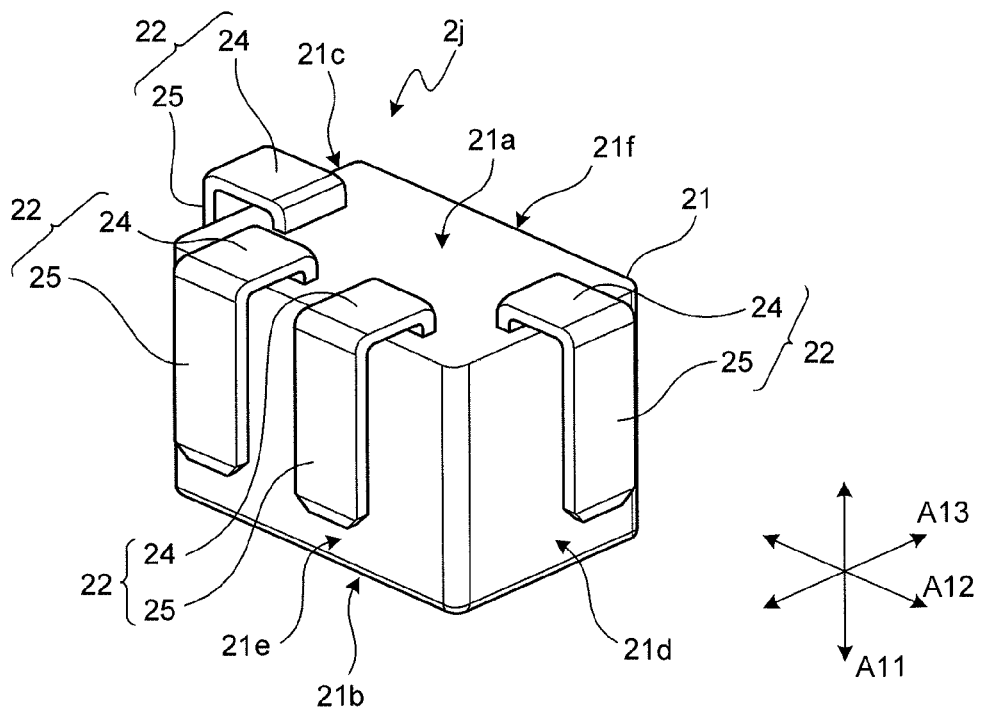
FIG. 17 is a perspective view illustrating a configuration of a relay according to a tenth modification example.

In the relay 2f according to the sixth modification example illustrated in FIG. 13, the fitting portions 25 of four tabs 22 extend from the base ends 24 to be parallel to the front surface 21e. In the relay 2g according to the seventh embodiment illustrated in FIG. 14, among the fitting portions 25 of four tabs 22, two fitting portions extend from the base ends 24 to be parallel to the front surface 21e and the other two fitting portions extend from the base ends 24 to be parallel to the back surface 21f. In the relay 2h according to the eighth embodiment illustrated in FIG. 15, among the fitting portions 25 of four tabs 22, three fitting portions extend from the base ends 24 to be parallel to the front surface 21e and the other one fitting portion extends from the base end 24 to be parallel to the right side surface 21d. In the relay 2i according to the ninth embodiment illustrated in FIG. 16, among the fitting portions 25 of four tabs 22, two fitting portions extend from the base ends 24 to be parallel to the front surface 21e and the other fitting portions 25 of the remaining two tabs 22 extend from the base ends 24 to be parallel to the right side surface 21d. In the relay 2j according to the tenth embodiment illustrated in FIG. 17, among the fitting portions 25 of four tabs 22, one fitting portion extends from the base end 24 to be parallel to the left side surface 21c, two fitting portions extend from the base ends 24 to be parallel to the front surface 21e, and the other one fitting portion extends from the base end 24 to be parallel to the right side surface 21d.

In the relay configurations illustrated in FIG. 5 and FIGS. 8 to 17, the base ends 24 are completely exposed from the relay main body 21, but at least parts of the base ends 24 may be covered with a resin. FIGS. 18A and 18B illustrate the relay configuration in which the entire base ends 24 are covered with a resin and this relay configuration will be described below as the eleventh modification example. FIG. 18A is a perspective view illustrating the entire configuration of the relay according to the eleventh modification example. FIG. 18B is a view illustrating the configuration of the relay according to the eleventh modification example when viewed from the direction of arrow A18 in FIG. 18A. In the relay 2k according to the eleventh modification example illustrated in FIGS. 18A and 18B, a plate-like insulating member 26 is attached along one surface (which corresponds to the top surface 21a in FIG. 5 or the like) of the relay main body 21. The insulating member 26 is formed in a substantially rectangular shape in a plan view by molding an insulating resin or the like. The insulating member 26 is formed to extend in a direction perpendicular to the left side surface 21c and the right side surface 21d facing the tabs 22 and to surround the base ends 24 of the tabs 22.

As illustrated in FIG. 18B, the base ends 24 are covered with the insulating member 26 in the axial direction thereof and the fitting portions 25 are disposed to protrude from the bottom surface of the insulating member 26. Protrusions 27 are formed in a shape having a stepped section at positions at which the insulating member 26 intersects the left side surface 21c and the right side surface 21d. The protrusions 27 come in contact with the top end face of the wall portion 44 when the relay 2k is assembled into the housing member 4.

According to this configuration, the base ends 24 of the tabs 22 can be supported from the upper side by the insulating member 26. Accordingly, since a load applied to the tabs 22 in fitting the tabs 22 to the terminal fittings 3 can be greatly reduced, it is possible to prevent deformation of the tabs 22. As a result, it is possible to keep favorable electrical connection state between the tabs 22 and the terminal fittings 3 and to prevent a decrease in the holding force of the relay 2k in the housing member 4. By covering the base ends 24 of the tabs 22 with the insulating member 26, it is possible to prevent a short circuit between the neighboring tabs 22.

For example, a configuration in which the base ends are not formed but each tab 22 includes only the fitting portion 25 and the fitting portion 25 protrudes directly from the bottom surface of the insulating member 26 can be considered.

While the embodiments of the present invention have been described in detail with reference to the drawings, the above-mentioned embodiments are only examples of the present invention and the present invention is not limited to the embodiments. Therefore, modifications in design or the like without departing from the gist of the present invention are included in the scope of the present invention.

According to the present invention, it is possible to suppress damage of a spring portion of a terminal fitting in an electronic component module.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic component assembly structure comprising:
    an electronic component;
    a terminal fitting to which the electronic component is fitted; and
    a housing member in which the electronic component and the terminal fitting are accommodated, wherein
    the electronic component includes a main body section having a rectangular parallelepiped shape and a terminal portion disposed in the main body section,
    the housing member includes a first housing chamber that guides and accommodates the main body section therein and a second housing chamber that accommodates and holds the terminal fitting therein, the first housing chamber is formed by surrounding four sides thereof with a frame-like wall portion rising upright from a bottom portion, and the second housing chamber is formed outside the wall portion interposed therebetween,
    the terminal portion includes a fitting portion that droops along a side surface of the main body section with a gap from the side surface and that is fitted to the terminal fitting,
    the terminal fitting includes a spring portion that presses the fitting portion, and a pressing direction of the spring portion is held to direct to the wall portion, and
    the electronic component, the terminal fitting, and the housing member are mutually assembled.

2. The electronic component assembly structure according to claim 1, wherein
    the second housing chamber includes an elastically deformable locking piece that holds the terminal fitting and that is disposed on the opposite side to the wall portion with the terminal fitting interposed therebetween.

3. An electrical junction box comprising:
    the electronic component assembly structure according to claim 1.

4. An electrical junction box comprising:
    the electronic component assembly structure according to claim 2.

* * * * *